Patented Nov. 7, 1933

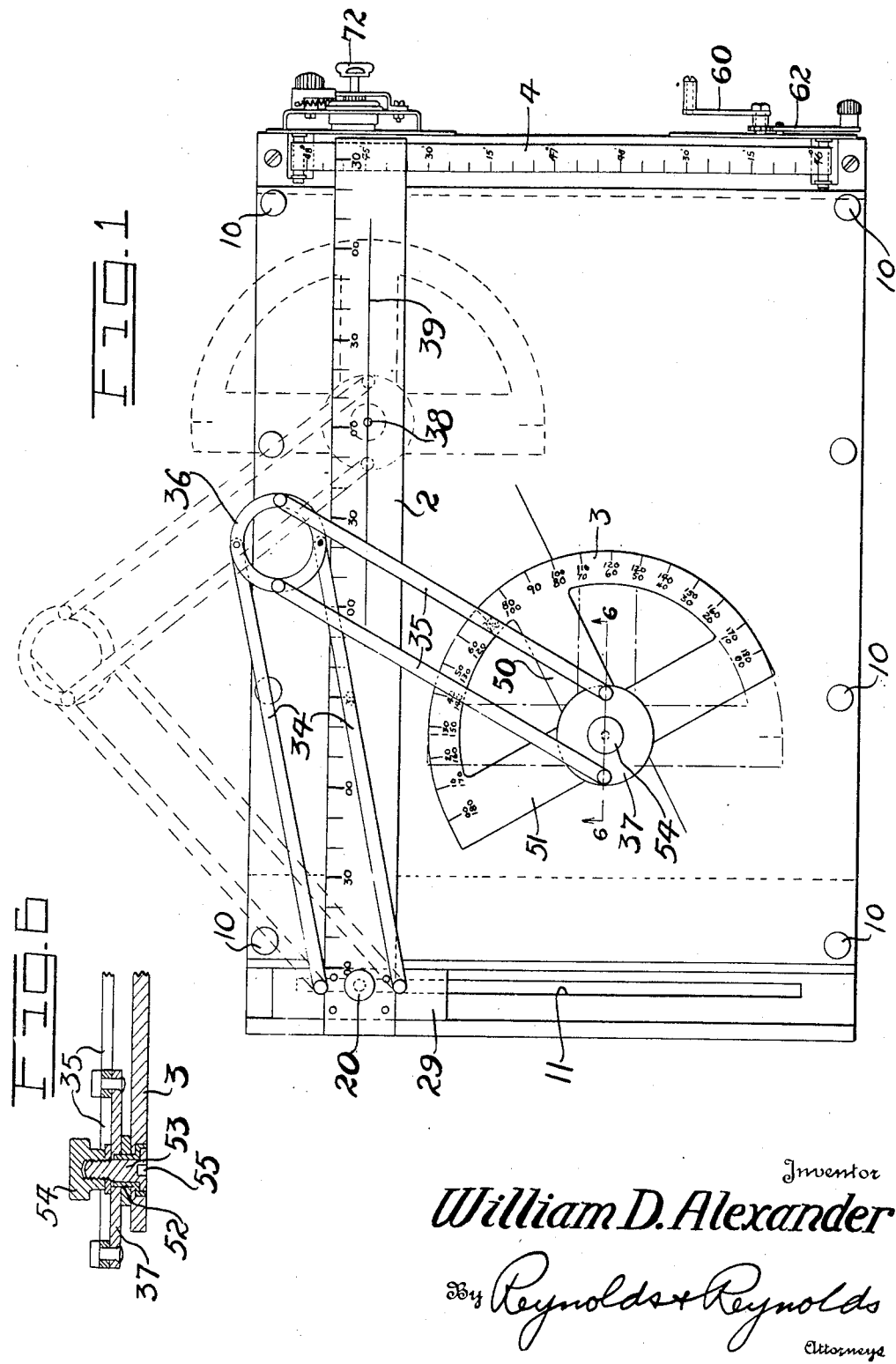

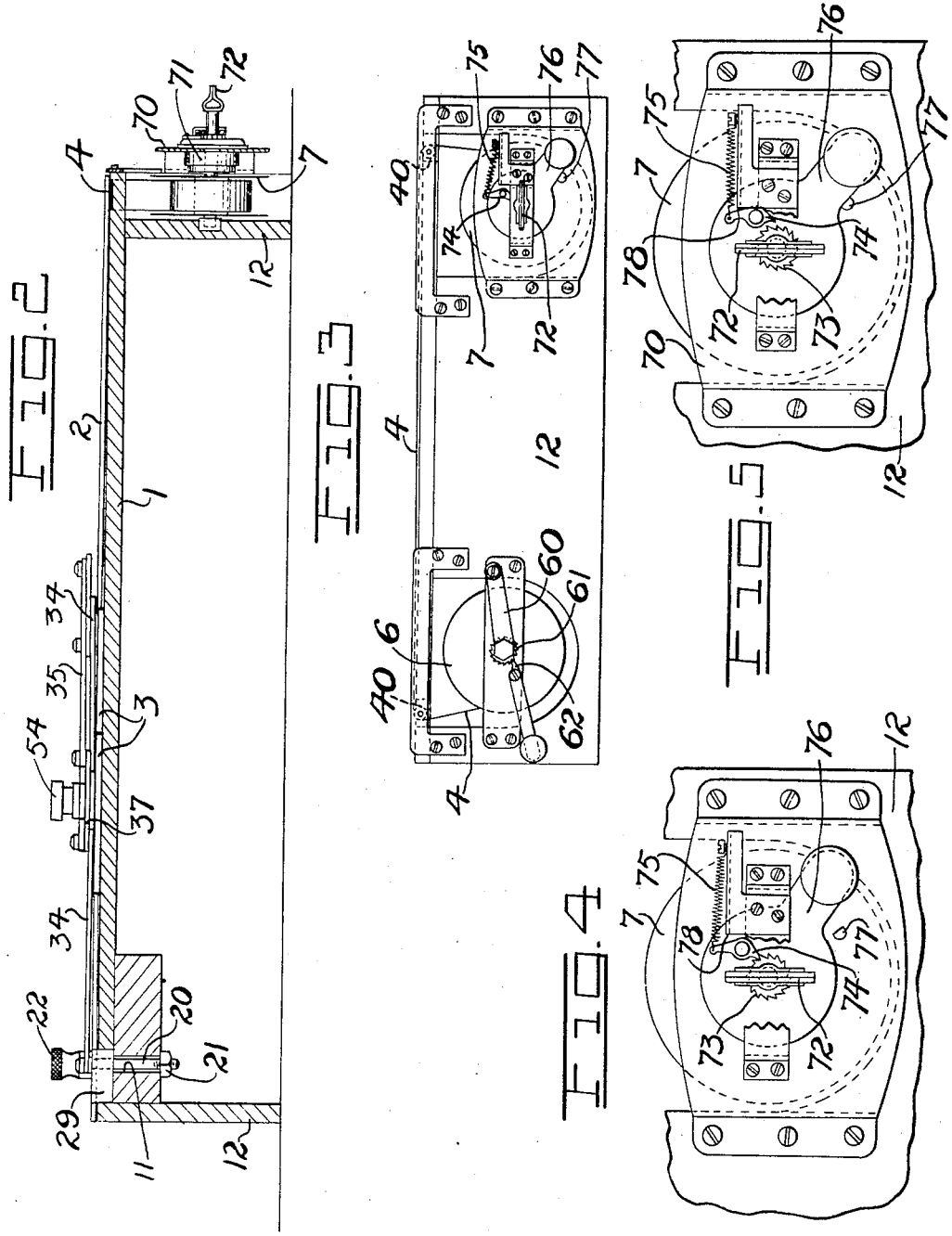

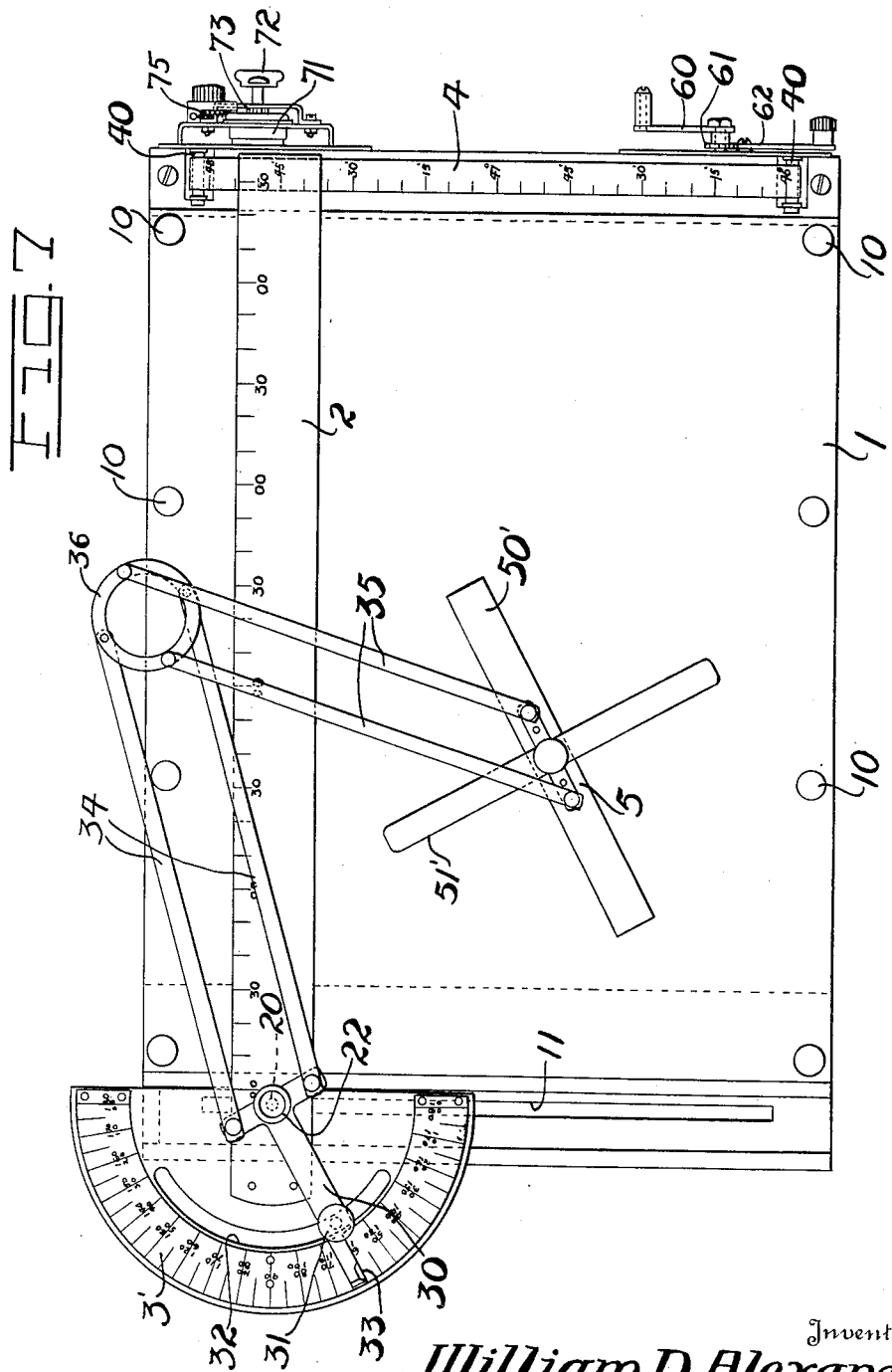

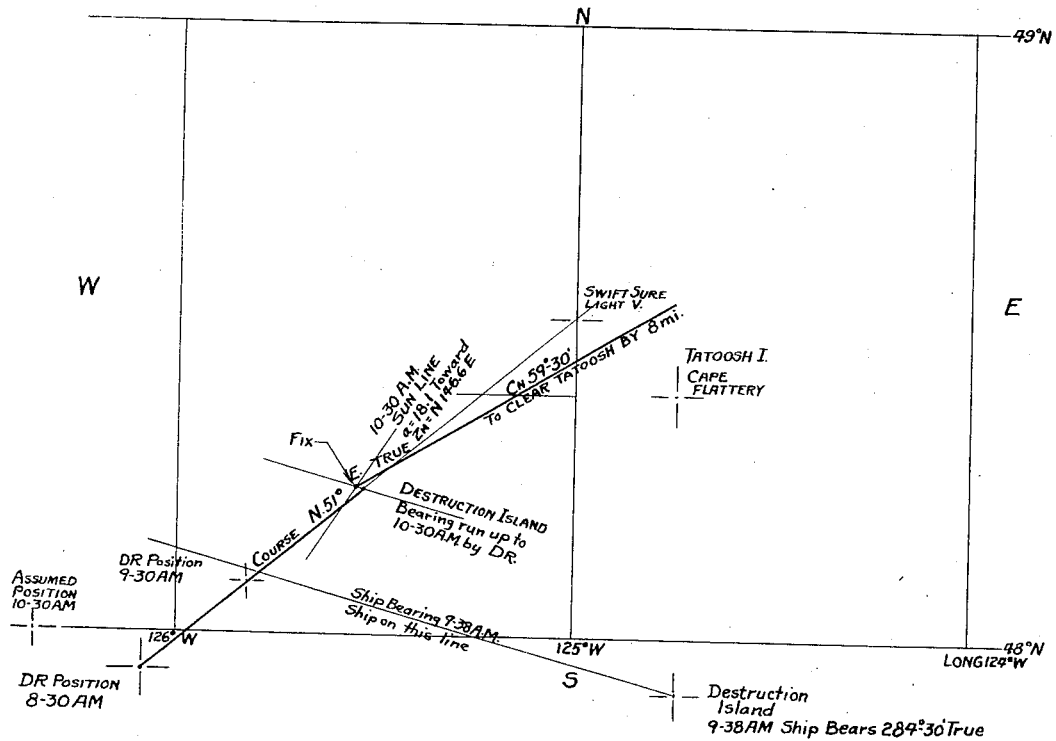

1,933,835

UNITED STATES PATENT OFFICE 1,933,835

PLOTTING INSTRUMENT

William D. Alexander, United States Army

Application July 24, 1929. Serial No. 380,722

9 Claims. (Cl. 33—79)

My invention relates to a plotting board intended for the use of those whose work regularly deals with angular relationships, such as navigators. It has for its main object the provision of a plotting board by means of which all problems dealing with angular relationships, such as those of navigation, may be solved simply, effectively, quickly, and without the necessity of employing any specially prepared plotting sheet, and which will do away with the use of parallel rulers.

Since it is not feasible to use a chart on so small a scale that the whole earth's surface is shown thereon, and it is not convenient (nor necessary) to use many large scale charts, a further object is to provide a plotting instrument arranged in small compass, so that the board may be used for any position on the earth's surface, and may be adjusted for any given position by a simple means of adjustment.

It is a further object to provide means whereby one skilled in the manual employment of such an instrument may, practically instantaneously, set off a course, line of position, line of bearing, or azimuth.

Generally stated, it is my object to provide a plotting board of the general character indicated, by means of which a graphic solution of any problem of navigation may be obtained in the minimum of time, without recourse to trigonometric tables, or other involved mathematical methods or means of arriving at the result, but enabling the checking of either result against the other.

It is a further and special object to provide an instrument of the general type described, which, by reason of the fact that it can be made small in size and yet thoroughly efficient for the purpose intended, can be employed by aviators.

Other objects, and especially such as pertain more particularly to structural details, will be ascertained from a study of the drawings forming a part of this specification, the specification itself, and the claims which terminate the same.

My invention comprises the novel parts and the novel combination and arrangement thereof, as shown in the accompanying drawings, described in the specification, and particularly as pointed out and defined in the claims, it being understood, however, that I do not limit myself to the exact construction shown, except as may be indicated in the claims attached hereto.

In the accompanying drawings, I have illustrated my invention, and one of the various problems which may be solved by the use of the same, the instrument being shown in forms which are now preferred by me.

Figure 1 is a plan view of the complete plotting board.

Figure 2 is a section transversely of the board.

Figure 3 is an end elevation of the board, illustrating the latitude scale, and its winding and release mechanism, and Figures 4 and 5 are detail elevations of the latitude scale winding and release mechanism.

Figure 6 is a detail section on line 6—6 of Fig. 1.

Figure 7 is a plan view of a modified form of plotting head and azimuth head.

Figure 8 is the layout of the graphic solution of a landfall problem, as solved by my plotting board.

The basis of my invention is a board 1, on which the plotting is done, and which is intended to receive a sheet of any sort, on which the problem is graphically worked out. The surface of the board itself, or a celluloid cover sheet, may be employed. Various means may be provided for holding paper to the board, as spring clips or simple thumb tacks, and I have conventionally illustrated such holding means at 10. As has been indicated, the plotting paper may be any type of paper, possibly paper which will be fitted into the navigator's notebook, but for purposes of convenience it may be found desirable to rule it vertically into divisions of longitude. These, of course, will not be designated as any particular meridians, but can be used for any selected meridians.

Slidable at one edge of the board, the left, as shown, is a straight-edge, which may take the form of a T-square, or like means, for ruling horizontal lines. This is indicated at 2. There is also provided a slidable azimuth head 3, which may function also as a plotting head, in the form of a protractor marked off in angular units, this being substantially uniformly movable over the surface of the board. The straight-edge may serve as a scale, being divided into units representing degrees and minutes of longitude, and if the paper is ruled as indicated above, the divisions on the paper and straight-edge should agree. It should be of such length that it will overlie a latitude scale shown at the right of the board, and indicated at 4, to which reference will be made hereafter. Obviously, if the straight-edge be not graduated, a separate longitude scale may be provided, and the straight-edge used only for drawing horizontal lines, as parallels of latitude.

As a matter of convenience the plotting head, by means of which angular lines may be drawn, may be formed integral with the azimuth head, by means of which the angularity of lines is determined. It is desired to point out, however, that this is by no means essential, for they may be separate, and separately supported. In fact, the plotting head will ordinarily be somewhat more convenient to use, if it is not formed integral with the azimuth head, and Figure 7, to be described in detail hereafter, illustrates such an arrangement.

The T-square or straight-edge 2, as has been noted, is slidable along the left edge of the board 1 in any suitable manner, but should be held in such manner that it is always true with respect to the board. As shown, a bolt 20 passes through the T-head 29 of the straight-edge 2, and through a slot 11 provided in the edge of the board 1, and at its lower end is engaged by a nut 21. The head 22 upon its upper end enables it to be grasped, so that it may be turned to thread it into or out of the nut 21, and by this means (or any other convenient means) the straight-edge may be clamped in a selected position.

A plotting head in combination with the azimuth head 3 is suitably supported for movement over the board, and in general consists of two arms arranged at right angles to each other, one being designated by the numeral 50 and the other by the numeral 51. While these arms are adjustable as to their angular position relative to the straight-edge 2, or an index mark 39 thereon, as will appear more fully hereafter, means are provided whereby they may be fixed in any selected angular position, and while so fixed in position be moved substantially universally over the board. A convenient means of support therefor is the common parallel motion arrangement found in drafting instruments, such as the pairs of links 34 and 35, anchored at one end to any suitable support, and connecting this support with a ring or disk 37 at the azimuth head. The anchor for the parallel links may be fixed upon the board 1, but it is preferable to mount it upon the shiftable T-head 29, in order to save space.

The azimuth head 3 is supported by the disk 37 (Fig. 6), but may be adjusted angularly with respect to the same; a sleeve 52 serves as the pivot, at the center of the azimuth head, and the screw 53 and nut 54 serve to clamp the latter in any adjusted position. The nut 54 also forms a convenient handle by which to move the head.

Angular adjustment of the azimuth head may be effected by fixing its center relative to an index such as the line 39, and (the nut 54 being loosened) swinging the head to bring any selected angular index mark into coincidence with the index 39. To facilitate this, the screw 53 may have a small socket 55 at its center, and a pivot pin 38 lying in the index mark 39 will be received in this socket, thus forming a pivot about which the azimuth head may be revolved. Once the desired angle is assumed by the azimuth head it may be clamped in position by the nut 54, and will thereafter retain this position as it is moved over the board.

It is possible to lay off the straight-edge 2 in degrees and minutes of longitude, since on all charts meridians of longitude are represented on the Mercator projection as parallel lines. However, when it comes to latitude, the progressive distortion of the meridians of longitude requires a corresponding distortion of the distance between the parallels of latitude, in order to maintain the relation between differences of longitude and differences of latitude. In effect, this requires that the scale used for distances at or near the equator be considerably less than distances actually the same on the earth's surface, but occurring nearer the poles. Accordingly, it is necessary to provide a varied and constantly changing scale for measuring latitude, and it is not convenient to place the entire latitude scale on a board for such use as this is intended. Accordingly, the scale 4 is made in the form of a tape, with graduations thereon representing degrees of latitude from the equator (0°) to latitude 65°, of course either north or south, which is the limit employed in Mercator projections, and which is sufficient for all practical purposes. If the board were used for plotting operations occurring in smaller areas—for instance for firing artillery problems—it might be feasible to employ a fixed scale graduated in yards or multiples thereof. It follows, then, that for navigational problems arrangements must be provided for storing the length of tape that is necessary, in order that the minimum distances be sufficiently spaced to render the solutions accurate, and to enable the use of a sufficiently large scale.

I have therefore provided two reels 6 and 7, on which the two ends of the tape 4 are received, the tape running thence over guide rollers 40 at the surface of the board 1, and immediately over the surface of the board at its right hand edge, beneath the straight-edge 2. One of the reels, as 7, may be provided with a spring mechanism, and the other with release and winding mechanism, though this may be arranged in any suitable manner, that suggested and shown herein being employed purely for the convenience of the navigator.

In order that the operation of the device may be clear, I will explain the construction of these reels, with the understanding that any substitute which will accomplish the purpose adequately may be employed in lieu thereof. Thus the reel 7 is journaled between one of the end supports 12 of the board 1 and a plate 70, likewise supported from the end support 12, and the winding spring 71 is operable by means of a key 72 to tension it whenever and to whatever extent this may be found desirable. A ratchet wheel 73 is fixed to the shaft of the reel 7, and a pawl 74, held in engagement therewith by a spring 75, normally prevents release of the tension upon the spring 71. This tension can be released when desired in any suitable manner, as for instance by means of an arm 76 movable between two limiting positions, in one of which it is stopped by a pin 77, at which time the pawl 74 is engaged with a fixed stop or shoulder 78 to release it. This position of the arm 76 is shown in Figure 5, which illustrates the released position, while the normal or holding position is shown in Figure 4.

The reel 6 may be turned to wind on the tape 4 by means of a crank handle 60, which causes tightening of the spring 71 as the tape unwinds from the reel 7. To unwind from the reel 6 and back upon the reel 7 by action of the spring 71, it is only necessary to release the reel 6, this being held normally in a locked position by a ratchet wheel 61, and a pawl 62. (See Fig. 3.)

It will be understood that the tension of the spring 71 operates through the reel 7 to maintain the tape 4 taut at all times, and the tension of the tape may be varied at will through adjustment of the spring tension by operation of members 72 and 76 as described. If the tape should be displaced accidentally from the edge of the board through being caught by a projecting member, for instance, upon being released the spring tension will automatically return it to its operative position. The locking means 61 and 62 will prevent the tape from returning to any but its former location, and the spring 71 will insure that it is drawn taut again in the precise position occupied before it was displaced. Any error through improper repositioning of the tape is thus eliminated.

The device as thus described is self-contained and compact, and may be employed in the solution of all types of navigational problems which require or can be solved by any graphic solution. By its use a plotting sheet for any selected latitude and longitude can be laid out, whether for use with this instrument or any other, and by the use of this instrument the plotting of a course or line may be accomplished in the minimum of time, and with the maximum of convenience. It is primarily intended for the plotting of an observed position by the use of lines of position obtained by astronomical observations, radio bearings, or visual bearings of fixed points, the position of which is known. It is adapted to the use of any and all of the navigational systems now in use.

For instance, let us assume that the navigator is approaching Tatoosh Island, at the entrance to the Straits of Juan de Fuca, in the morning, (see Figure 8). At 8:30 A. M. the dead reckoning position of the ship was computed to be 47°—50.7' north latitude, 126°—5.3' west longitude. The ship is steaming on a course 51° true, which means that the angle of the course on which she was proceeding was 51° from a line running through the ship's position and thence due north. Upon the determination of the dead reckoning position, the navigator places on the plotting board a sheet of paper, and sets the tape scale at a latitude which will include the latitude of the point for which the ship is steering. The parallels of latitude for 48° and 49° are ruled off by means of the straight-edge 2, the meridians of longitude representing 126° and 125° west longitude are ruled off, using either a triangle or the plotting head including arms 51 and 50 with the arm 50 set at 90°. The dead reckoning position is then plotted on the paper, being represented by a small dot (see Fig. 8). The navigator then sets the azimuth head at 51 in the northeast quadrant, that is, at 90° plus 51°, and using the edge of the arm 50 on the plotting head, resting that edge on the dead reckoning position, draws a pencil line toward the direction in which the ship is steaming, and which represents the ship's course. At 9:38 A. M. the radio operator reports that the radio station on Destruction Island reports the ship's bearing from Destruction Island as 284° 30 minutes true. The navigator sets the arm 50 at 104° 30 minutes, for the reason that 104° 30 minutes is the same as 284° 30 minutes in the opposite quadrant. He then places the edge of the arm 50 through the position already plotted of Destruction Island, and draws a pencil line along the edge of arm 50 until it intersects with the course line. At 10:30 A. M. the navigator observes the sun for a line of position which is laid off on the board as follows.

Let us assume that he uses the method laid down in Hydrographic Office Publication 208, generally referred to as H. O. 208. Using the arm 51, the navigator sets off the azimuth obtained from his computation, and lays the edge of the arm 51 through the so-called assumed position. Using a pair of dividers, he sets the dividers by means of the tape scale to represent the number of miles obtained for the argument "little $a$," which is also known as the altitude difference. This altitude difference is laid off along the edge of arm 51 from the assumed position, and a line is then drawn along the edge of arm 50. This line becomes the line of position. It is intended that the edge of arm 50 shall be as far away from the assumed position as the length of the altitude difference. Using dead reckoning methods, the line of bearing from Destruction Island is now advanced for the ship's run between the time the bearing was received and the time the sun was observed for a line of position, a difference of about an hour. The intersection of these two lines, that is, the line of position obtained by an observation of the sun and the line of bearing from Destruction Island, advanced for the ship's run between their respective times, is the fix, or position of the ship at 10:30 A. M. Now, having plotted the positions of Swiftsure Light Vessel and Tatoosh Island, between which the ship desires to pass, draw a line from the fix, passing between the two points named, at any desired distance from one or the other. Move arm 50 until its edge rests along this line drawn. Clamp azimuth head and read course required for the ship to steer, relative to the index line 39, or any other line parallel thereto. The ship continues on the course obtained, and at a later time in the day, about noon-time, observes Tatoosh Island bearing on the starboard bow.

The navigator now sets the pelorus to read 26½°, and notes the time when Tatoosh bears at that angle. He then sets the pelorus at 45°, and notes the elapsed time between bearing 26½° and 45°, and computes the ship's run between bearings. By means of the plotting board the true bearing noted first is set off from Tatoosh Light, that is the arm 50 is set to read an angle which is the sum of the course angle and 26½°, and a line drawn along the edge of the arm 50 indicating that bearing. Similarly, a line is drawn showing the true bearing of the ship when Tatoosh bore 45° on the bow. The azimuth arm 50 is now set back to the course upon which the ship is running, and by taking the dividers and setting them to the ship's run between bearing, using the tape scale to obtain the proper distance, the plotting head is moved in the appropriate direction until the dividers touch one point on the bearing line first taken from Tatoosh and the other point on the second bearing line. This will indicate the correct position of the ship with regard to Tatoosh Island, and will also indicate the distance that Tatoosh will be passed abeam, providing the ship follows the same course. Attention is drawn to the fact that the dividers, set to the run between bearings, are rested against the edge of arm 50, and move with that arm. The ship is now in restricted waters, and the navigator naturally resorts to his large scale chart in conducting the ship from Tatoosh to his destination in Puget Sound.

The foregoing illustrates the types of problems that can be solved quickly and accurately by the use of this plotting board. In addition, it may be mentioned that problems involving mooring and maneuvering of all classes of war vessels can also be solved by the use of this board. Likewise, by means of this board the problem of computing approach run for torpedo shots by torpedo boats may be solved.

This plotting board adapts itself particularly to use in aircraft, due to its small and compact size, and the simplicity of its operation. If necessary, the operator can manipulate the settings of the board by the use of one hand only, allowing the other hand free for the control of the plane. The tape control or setting mechanism is particularly designed for manipulation by the use of one hand only. The azimuth head requires only one setting, which can be accomplished by the use of one hand also.

In Figure 7 I have shown a modified form of plotting board, chiefly distinguished from that heretofore described in that the azimuth head and plotting head are distinct, one from the other. The azimuth head 3' is secured upon the end of the straight-edge 2, and has pivoted upon it a T-shaped azimuth arm 30, which swings freely upon the bolt 20, even though the latter may be clamped in position. This azimuth arm 30 may be fixed in position relative to the azimuth head 3' by suitable means, such as the clamping screw 31, passing through the arcuate slot 32 in the azimuth head, and cooperating with a suitable nut (not shown) to clamp the azimuth arm to the head 3'. An index, such as the edge 33 upon an extension of the arm 30, cooperates with the angular scale upon the azimuth head 3'.

In this form the adjustment of the plotting head 5, including the crossed arms 50' and 51', is obtained by anchoring the ends of parallel links 34 to the arms of the T-shaped azimuth arm 30, and the ends of the links 35 directly to the plotting head 5. The plotting arm 50' will always remain parallel to the azimuth arm 30, the position of the latter controlling the position of the former, and, of course, controlling also the position of the plotting arm 51'.

This modified form may be found advantageous, according to individual preference, because of the comparative freedom of the plotting head from obstruction, but I prefer the form first described because of the direct reading of angles possible with the azimuth head at the plotting head, and movable over the plotting sheet, and because of the impossibility of error due to flexibility of the parallel links mechanism, or to loose connections.

What I claim as my invention is:

1. A navigator's plotting instrument comprising a plotting board, a straight-edge divided into units representing longitude, means associated with said board for controlling said straight-edge for movement through parallel positions between the top and bottom of the board, a plotting head including an arm adjustable in angle, and substantially universally shiftable over the board, means supporting said plotting head from the board, means for adjusting and fixing the angular position of said plotting head and arm, a tape divided into units of latitude placed at right angles to said straight-edge, the length of said tape and scale being several times the width of the board, and reel means carried by the board for storing said tape and shifting it over the board, to bring to view upon the board any selected portion of the latitude scale.

2. A plotting instrument comprising a plotting board, a straight-edge marked in appropriate units, means on said board for controlling said straight-edge for movement through parallel positions between the top and bottom of the board, a tape divided into units of latitude, and positioned for movement over the board substantially at right angles to the straight-edge, the length of said tape and scale being several times the height of the board, and cooperating therewith, reeling and winding mechanism mounted on said board for positioning fractional portions of said tape upon the board, to bring to view for cooperation with the straight-edge any selected portion of the latitude scale, a plotting head adjustable in angle, and substantially universally shiftable over the board, an azimuth head supported from the board, bearing a scale, associated with said plotting head, and angularly adjustable, to adjust the angular position of said plotting head, and parallel motion means connecting said azimuth head and said plotting head.

3. A plotting instrument including a board, a transverse straight-edge guided thereon and shiftable through positions always parallel, an azimuth head fixed to said straight-edge, an azimuth arm pivoted upon the straight-edge and angularly adjustable about said azimuth head, plotting arms movable over the board, remote from, and independent of the azimuth head, means supporting said plotting arms from said azimuth arm, to transmit angular motion of the azimuth arm to the plotting arms, and to retain the plotting arms in any selected angular position, determined by the position of the azimuth arm, during the movement of the plotting arms over the board.

4. The combination of claim 3, and means to secure the straight-edge in any selected position, and further means to secure the azimuth arm in any selected position.

5. A navigator's plotting instrument including a board, a tape graduated in units of latitude of length a plurality of times the height of the board, and disposed along an edge thereof, a transverse member guided on said board and shiftable through positions perpendicular to said tape, and always parallel to itself, and means mounted on said board for reeling and storing said tape for adjustment to bring a selected portion only thereof into view upon the board, to coact with said transverse member for the determination of the latitude of a point on the board.

6. A plotting instrument for navigator's use comprising a board, a tape graduated in units of latitude and of a total length greatly exceeding the height of the board, and disposed along an edge thereof, spools mounted on said board for receiving the ends of said tape and for winding the same on and off, to bring any selected portion into view upon the board, angularly adjustable plotting arms, and means supporting the same from the board for adjustment angularly about their center and for movement in all directions over the board, to establish, in cooperation with the tape scale, a course in relation to any desired parallel of latitude.

7. The combination of claim 6 and a longitude scale of fixed length supported from the board and cooperating with the plotting arms to establish a course in relation to any desired meridian as well as any parallel of latitude.

8. A plotting instrument including a board, a transverse straight-edge guided thereon and shiftable through positions always parallel, an azimuth head fixed to said straight-edge, an azimuth arm pivoted upon the straight-edge and angularly adjustable about said azimuth head, plotting arms movable over the board, means supporting said plotting arms from said azimuth arm, to retain the plotting arms in any selected angular position, determined by the position of the azimuth arm, during the movement over the board, a clamp screw at the center of the azimuth head operable to secure the straight-edge in any selected position, and a second clamp screw outward of such center to secure the azimuth arm to the head, to retain the former in any selected position.

9. A plotting instrument including a board, a transverse straight-edge guided thereon and shiftable through positions always parallel, an azimuth head angularly adjustable relative to said straight-edge and adapted for movement over said board, pivot means supported from the board with which said head may be engaged and about which it is angularly adjustable when so engaged, said pivot means having associated with it an index cooperating with the azimuth scale, whereby the angular adjustment of the azimuth head relative to the straight-edge may be determined or a desired angular relation established, and means for maintaining said head in such established angular relation to said straight-edge during movement of the head over the board.

WILLIAM D. ALEXANDER.